United States Patent [19]
Tan et al.

[11] Patent Number: 4,680,782
[45] Date of Patent: Jul. 14, 1987

[54] TOMODENSITOMETRY IMAGE ACQUISITION AND RECONSTRUCTION PROCESS AND A TOMODENSITOMETER USING THIS PROCESS

[75] Inventors: Siv Chang Tan, Paris; Tri Hue Nguyen, Le Pre St. Gervais; Claude Benchimol, Paris, all of France

[73] Assignee: Thomson-CSF, Paris, France

[21] Appl. No.: 662,715

[22] Filed: Oct. 19, 1984

[30] Foreign Application Priority Data

Oct. 25, 1983 [FR] France ................... 83 16995

[51] Int. Cl.$^4$ ............................................. A61B 6/00
[52] U.S. Cl. ............................................ 378/4; 378/19
[58] Field of Search .................... 378/19, 901, 4; 250/363.8

[56] References Cited

U.S. PATENT DOCUMENTS

| | | | |
|---|---|---|---|
| 3,934,142 | 1/1976 | Hounsfield | 378/19 |
| 3,940,626 | 2/1976 | Hounsfield | 378/19 |
| 3,944,833 | 3/1976 | Hounsfield | 378/19 |
| 4,048,505 | 9/1977 | Hounsfield | 378/19 |
| 4,176,280 | 11/1979 | Greschat et al. | 378/19 |
| 4,555,760 | 11/1985 | Op de Beek et al. | 378/901 |

FOREIGN PATENT DOCUMENTS 0094124 11/1983 European Pat. Off. .

OTHER PUBLICATIONS

Kowalski et al., "New Means for Picture Formation in Computer Tomography", Optik, vol. 55, No. 1, Feb. 1980, pp. 67-86.
IEEE Transactions on Nuclear Science, vol. NS-26, No. 2, Apr. 1979, IEEE New York (US) G. Kowalski: "Multislice Reconstruction from . . . ".

*Primary Examiner*—Janice A. Howell
*Attorney, Agent, or Firm*—Roland Plottel

[57] ABSTRACT

An image acquisition and reconstruction process for increasing the definition of the radiological image obtained by tomodensitometry. The invention consists in taking two series of data or "views" and in arranging this data by causing the views $W_i$ of the second series to undergo a translation of $-\pi\theta$ and a symmetry $-\gamma$, in the space $[\theta,\gamma]$, $\theta$ being equal to $\beta+\gamma$; $\gamma$ designates the angle between the different detectors and the straight-line joining the origin of the fan-shaped X ray beam to the center of rotation of the source-detectors assembly and $\beta$ represents the different angles of the source-detectors assembly at which acquisition of the views is made.

12 Claims, 8 Drawing Figures

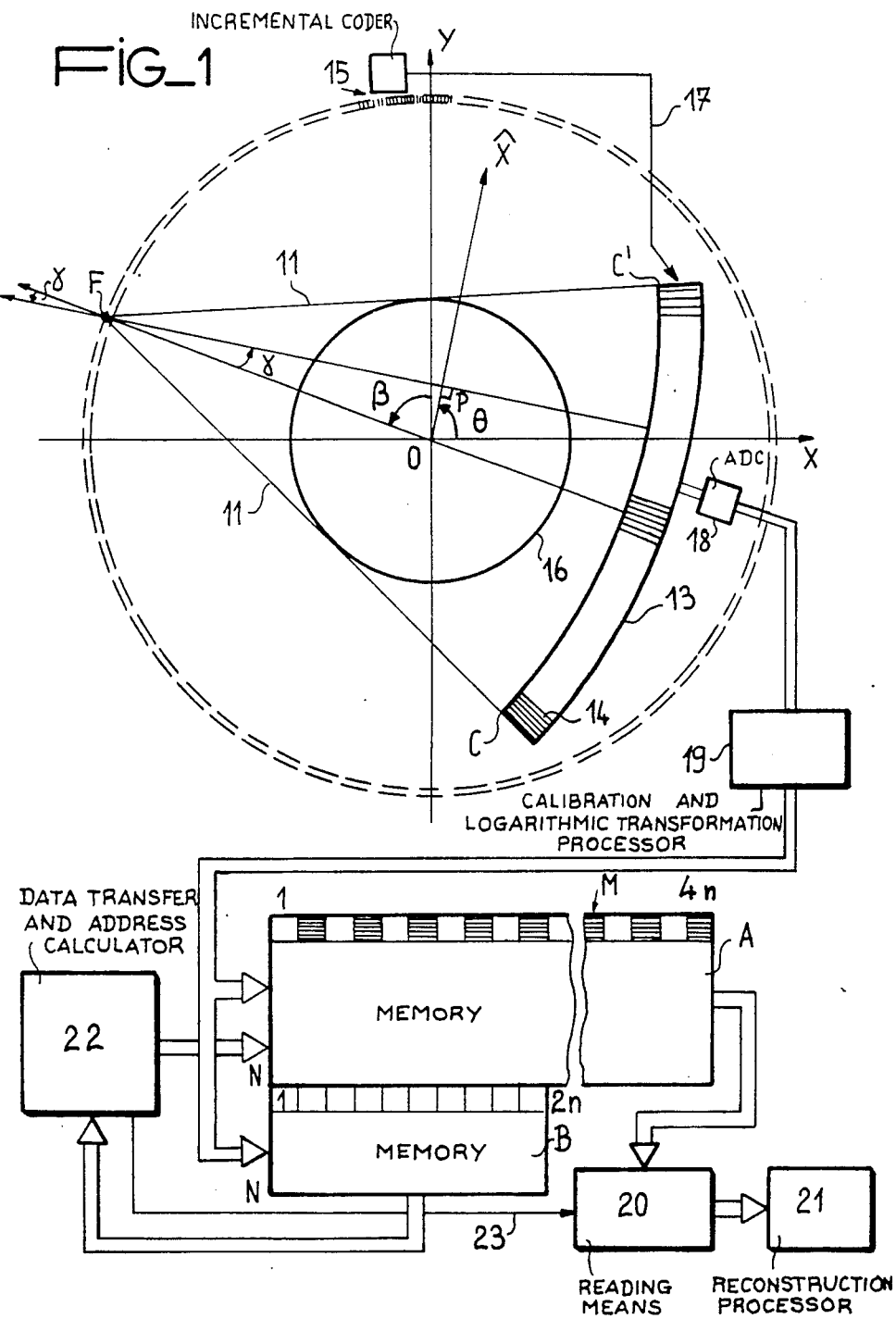

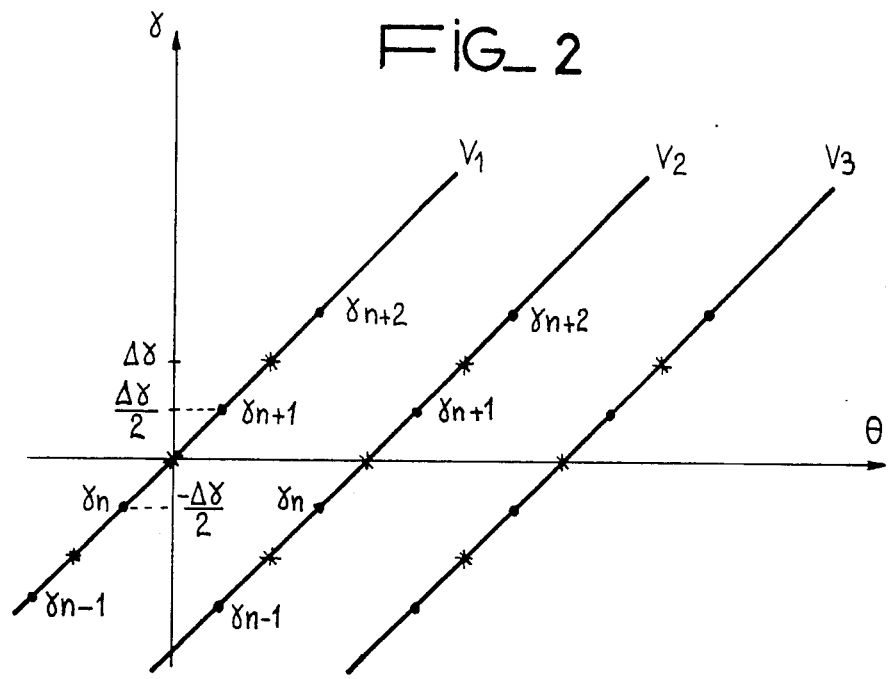
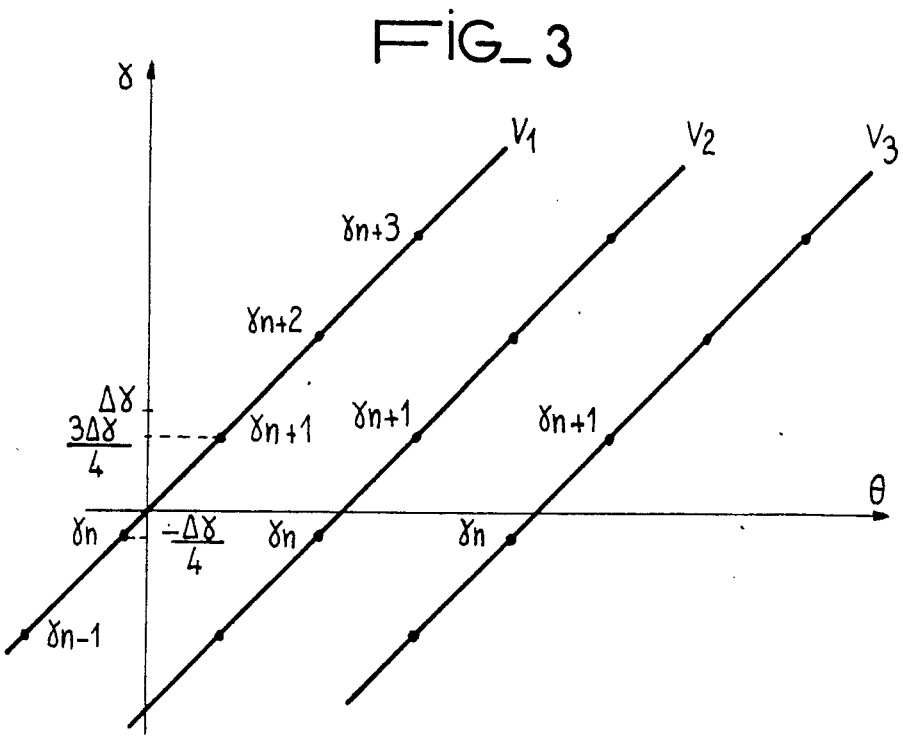

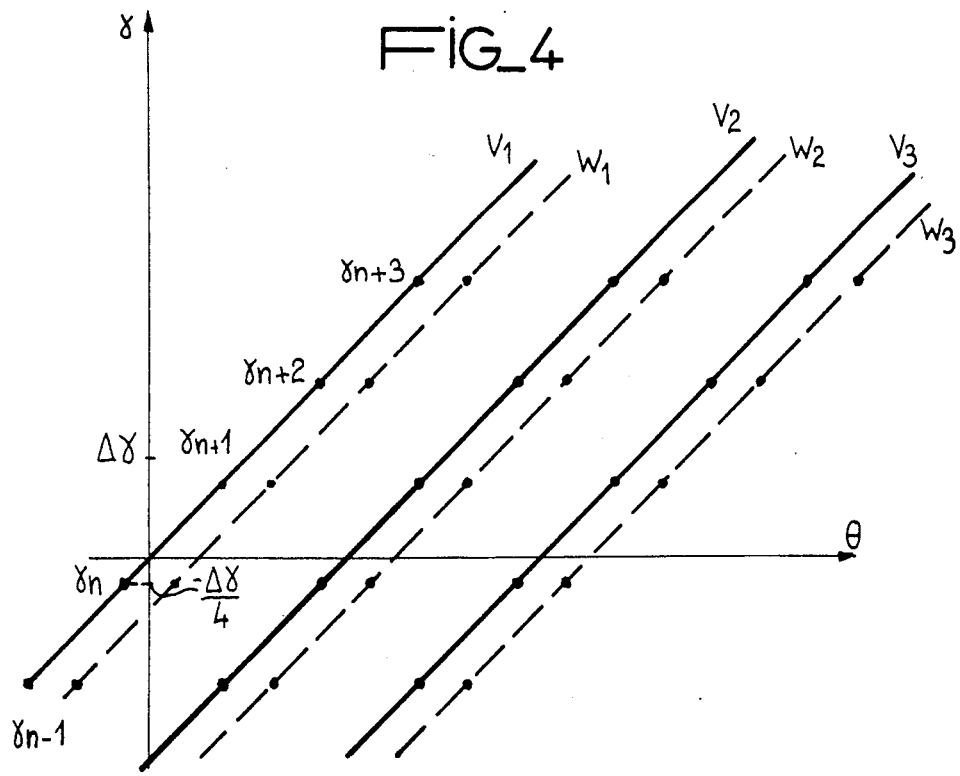
FIG_4
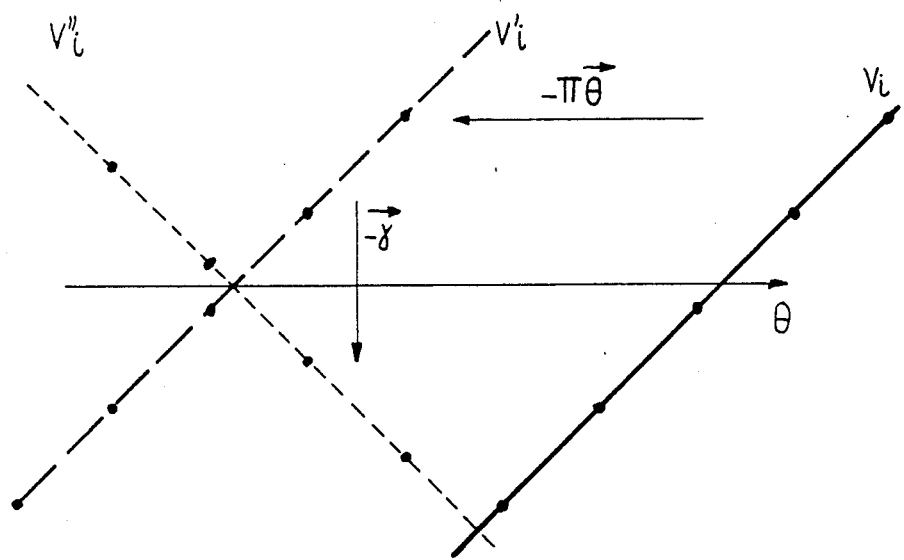
FIG_5

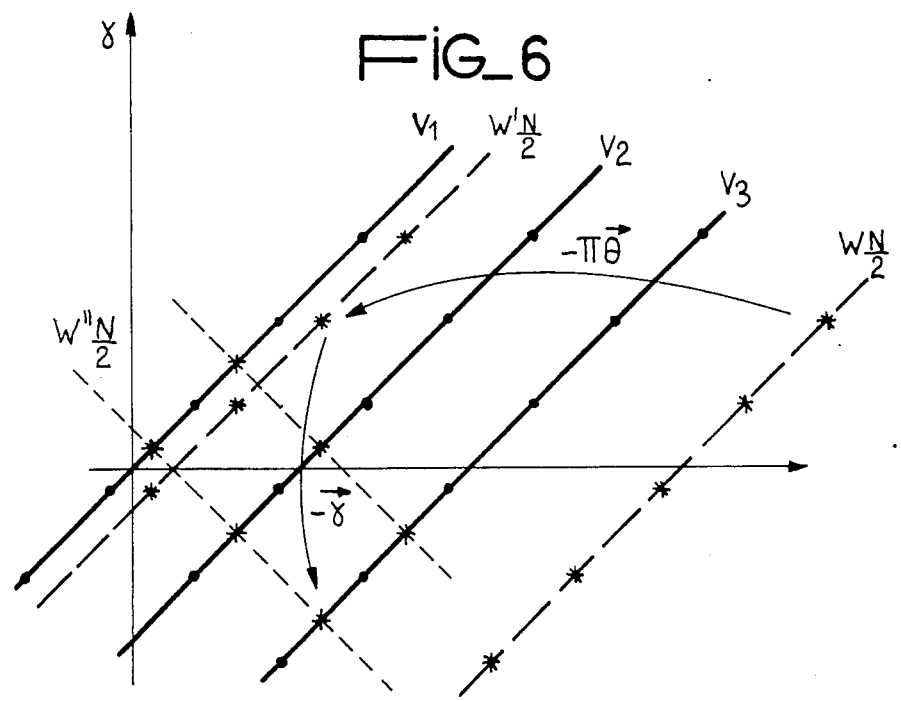
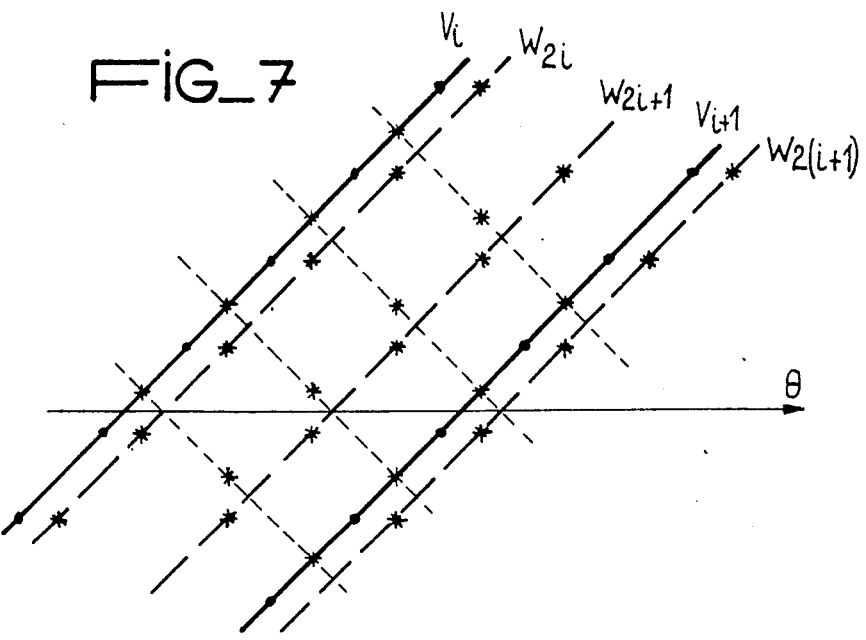

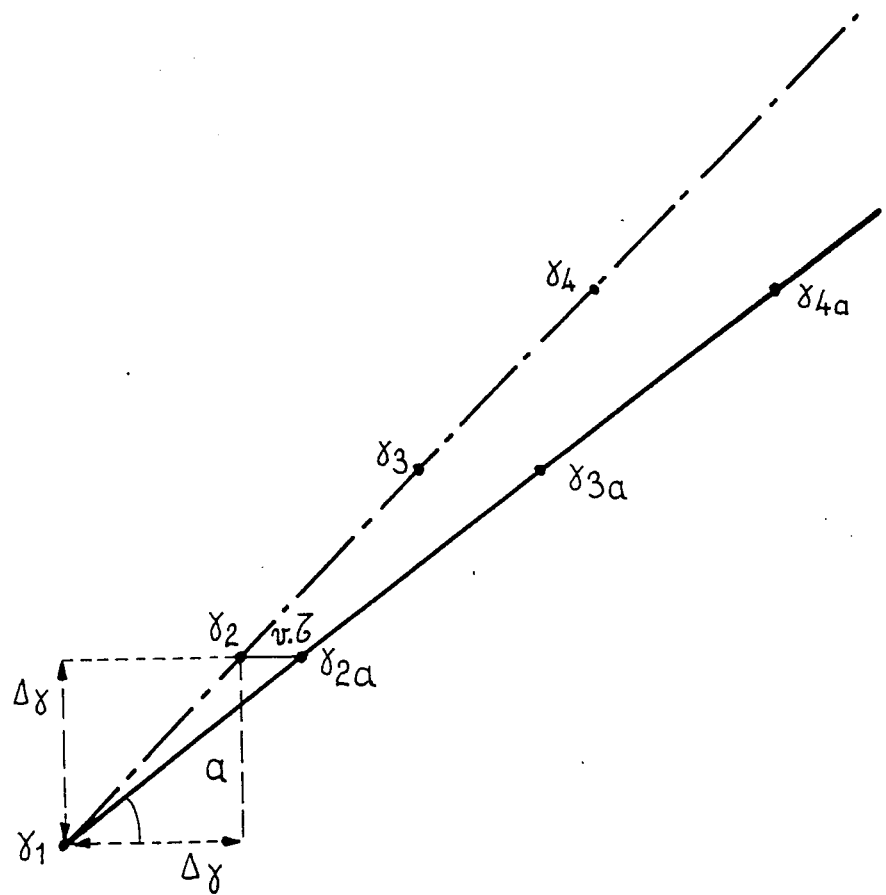

TOMODENSITOMETRY IMAGE ACQUISITION AND RECONSTRUCTION PROCESS AND A TOMODENSITOMETER USING THIS PROCESS

BACKGROUND OF THE INVENTION

1. Field of the Invention

The invention relates to a tomodensitometry image reconstruction process more particularly directed to improve the resolution of the reconstructed image without increasing the cost of the technological structure of the means for measuring the penetrating radiation absorption. The invention also relates to any tomodensitometer adapted for using this process.

2. Description of the Prior Art

The so called "third generation" tomodensitometers comprise essentially a source of penetrating radiation (X rays) emitting a flat fan-shaped beam, a curved row of detectors placed opposite this source for measuring the unabsorbed fraction of the radiation in the plane of the section whose image is to be displayed means for rotating the source and the detectors in the plane of this section and a computer for processing the data supplied by the detectors and reconstructing an image from said data. The resolution of the reconstructed image depends more especially on the number of detectors covering the fan of the X ray beam. For a given beam opening, the higher the number of detectors the better the definition. However, the multidetector assembly is one of the most expensive parts of the tomodensitometer and one which is very difficult to produce with good reliability. Consequently, increasing the number of detectors over a given sector corresponding to the fan, comes up against technological limits.

SUMMARY OF THE INVENTION

One of the aims of the invention is to substantially improve the definition of the image without modifying the technological structure of the source-detector assembly.

Another aim of the invention is also to reduce the cost of constructing a tomodensitometer having the same definition as existing tomodensitometers. This reduction in cost being obtained by using a multidetector assembly comprising half the number of detectors as in existing machines. In this latter case, not only would the multidetector assembly be easier and less expensive to produce, but the reduction in cost would also extend to the electronic data acquisition means.

According to the invention, these aims are reached by a tomodensitometry image reconstruction process of the type consisting in rotating a source-detectors assembly in the plane of a cross-section whose image is to be displayed, said source emitting a penetrating radiation beam in the form of a fan and in taking and storing a succession of views for different angles $\beta$ during rotation of this source-detectors assembly with respect to a fixed reference axis system of said plane, said detectors being arranged to converge towards the focal point of said source and each view being sampled for angles $\gamma$ representative of the detectors and indexed from the straight line joining the center of rotation of the source-detectors assembly to said focal point, the angular shift between two adjacent detectors being constant $\Delta\gamma$ and the angular shift between views being constant, which process further consists, with the angular shift between said straight line and the detector the nearest thereto being adjusted to $|\Delta\gamma/4|$ and the following conditions being provided: $\pi/(\Delta\gamma e)=N$, with N a positive integer assuming $\gamma_e=(1+\alpha)\gamma$ where $\alpha$ is a coefficient depending on the speed of rotation of the source-detectors assembly and on the time for acquisition of a view;

in taking and storing two series of views with an angular shift between views of $h\Delta\beta$ for the first series and $\Delta\beta$ for the second series, at least some of the views of the two series being offset therebetween by $|\Delta\gamma e/2|$, with $\Delta\beta=2\Delta\gamma_e$, h being a positive integer;

in completing the views of the first series by sampled values of the second series whose coordinates ($\theta'$, $\gamma'$) located in space [$\theta$, $\gamma e$] with $\theta=\beta+\gamma_e$ satisfy the relationship:

$$(\theta x, \gamma x)=(\theta'+(2k+1)\pi,-\gamma')$$

with k a relative integer, ($\theta x$, $\gamma x$) being the coordinates in space [$\theta$, $\gamma_e$] of the desired sampled values in the first series and in applying a reconstruction algorithm, known per se, comprising a convolution and back projection, to the completed views of the first series for reconstituting an image.

The invention also relates to a tomodensitometer of the type comprising a source-detectors assembly mounted for rotation in a plane of a cross section to be displayed, said source being a penetrating radiation source in the shape of a fan and said detectors being arranged so as to converge towards the focal point of said source, said detectors being seen from said focal point at respective angles $\gamma$ indexed from the straight line joining said focal point to the center of rotation of the source-detector assembly, two adjacent detectors being angularly offset by $\Delta\gamma$:

control means for determining a certain number of view taking angles $\beta$ of the source-detector assembly with respect to a reference axis system and for generating signals controlling said view takings, means for storing informations representative of said sampled views for the above mentioned angles $\beta$ computing means for applying a reconstruction algorithm, known per se, comprising a convolution and a back projection to a series of views, wherein:

the following conditions are satisfied: $\pi/\Delta\gamma e=N$, with N a positive integer, assuming that $\gamma_e=(-1+\alpha)\gamma$, where $\alpha$ is a coefficient dependent on the speed of rotation of the source-detector assembly and on the time for acquisition of a view:

an angular shift between said straight line and the detector the closest thereto is predetermined at $|\Delta\gamma/4|$ the control means comprise means for taking and storing two series of sampled views, said series being such that at least some adjacent views of different series are shifted therebetween by $|\Delta\gamma e/2|$; the views of the first series being angularly shifted at the pitch of $h\Delta\beta$ and those of the second series being shifted angularly at the pitch of $\Delta\beta$, with $\Delta\beta=2\ \Delta\gamma_e$ and h a positive integer, and it comprises rearrangement means for completing the views of the first series by sampled values taken from the second series whose coordinates ($\theta'$, $\gamma'$) in space [$\theta$, $\gamma e$] with $\theta=\beta+\gamma_e$ satisfy the relationship $(\theta x,\ \gamma x)=(\theta'+(2k+1)\pi,-\gamma')$ with k a relative integer, ($\theta x$, $\gamma x$) being the coordinates in space [$\theta$, $\gamma_e$] of the desired sampled values taken from the first series.

BRIEF DESCRIPTION OF THE DRAWINGS

The invention will be better understood and other advantages will appear from the following description of the process and of the essential components of a tomodensitometer operating in accordance with this process, with reference to the accompanying drawings in which:

FIG. 1 is a schematical diagram of the main components of the tomodensitometer putting the invention into practice;

FIG. 2 is a representation in space $[\theta, \gamma]$ of the views taken by a conventional tomodensitometer operating in pulsed mode for reconstructing an image;

FIG. 3 is a representation in the same space $[\theta, \gamma]$ of the views taken by a tomodensitometer of the same type to which one of the modifications has been made for implementing the invention, namely steady shift between the source and the detectors;

FIG. 4 is a representation in space $[\theta, \gamma]$ of the views taken by a tomodensitometer operating according to the procedure of the invention;

FIG. 5 is a representation in space $[\theta, \gamma]$ of the result of a transformation, forming part of the invention, applied to a view;

FIG. 6 illustrates the result of application of this transformation to some views of FIG. 4;

FIG. 7 illustrates in space $[\theta, \gamma]$ the result of the same transformation applied to a variant of the invention; and FIG. 8 is a representation in space $[\theta, \gamma]$ of a view, in the case of a tomodensitometer operating in continuous mode.

DESCRIPTION OF THE PREFERRED EMBODIMENTS

The rest of the description, with reference to FIGS. 1 to 7, relates to the particular case of a tomodensitometer operating in pulsed mode. This kind of tomodensitometer is well known. In most cases, the pulsed mode is concretized by the fact that the fan-shaped beam is only emitted for a very brief period of time at the moment when the source-detectors assembly is at a predetermined angle $\beta$. In this case, it is sufficient that the reading of all the detectors is finished when the source-detectors assembly reaches the next angle $\beta$. However, another way of providing said pulsed mode may consist in permanently generating the fan-shaped beam but in "reading" all the detectors simultaneously at each angle $\beta$. In the case of pulsed mode operation, and as will be verified further on, the above mentioned coefficient $\gamma_e = \gamma$ and $\Delta\gamma_e = \Delta\gamma$.

Referring to FIG. 1, the essential components to a tomodensitometer have been shown. This apparatus comprises a source-detectors assembly rotatable in a plane of a cross section whose image is to be displayed. The center of rotation is O and the plane of the cross section will be considered as being that of FIG. 1. With this cross sectional plane is associated a fixed orthonormed reference axis system XOY. The source is symbolized in the drawing by its focal point F. As is well known, it is a source of penetrating radiation and more particularly of X rays, emitting a fan-shaped beam 11. In the rest of the description, mention will be simply made of source F. The case 13 containing all the detectors 14 has a curved shape so that these detectors 14 are arranged along an arc of a circle $\widehat{CC'}$ which is geometrically centered on the focal point F. The fan shaped beam 11 covers the arc of a circle $\widehat{CC'}$ occupied by the input faces of detectors 14. Thus, the reconstituted image will be inside circle 16 with center O, inscribed within the limits of the angle $\widehat{CFC'}$. Conventionally, an assembly may be used comprising 1024 detectors 14. The case 13 and source F are fixed to the same rotating support (center of rotation O) and fixed with respect to one another so that rotation of the source-detectors assembly may be identified by angle $\beta$ between axis OY and a straight line OF.

The linear attenuation values of the X ray beam for predetermined angles $\beta$ are taken and stored in a memory M of a computer. For each predetermined angle $\beta$ an order for reading detectors 14 is emitted, for example by means of an incremental coder 15 adapted for reading angle informations carried by the rotating source-detectors assembly and for delivering (control connection 17) control orders for reading the state of all the detectors 14. The set of values taken for a given angle $\beta$ is called "view".

It may be considered that each view is sampled through the very structure of the detector assembly, for angles $\gamma$ representative of the detectors. Each angle $\gamma$ indicating the position of a detector 14 is located from the straight line OF. Thus, the constant angular shift between the centers of the input faces of two adjacent detectors 14 will be called $\Delta\gamma$.

If, for each angle $\gamma$ of a view, we consider the axis $O\hat{X}$ perpendicular at P to the ray of angle $\gamma$ striking a given detector, it can be readily shown that the angle $\theta$ between the axis OX of the fixed reference and axis $O\hat{X}$ is such that: $\theta = \beta + \gamma$ and this for all cases, the angles $\theta$, $\beta$, and $\gamma$ being orientated, or else $\gamma = \theta - \beta$.

According to this latter relationship, it can be seen that the different views (for different angles $\beta$) have an extremely simple representation in space $[\theta, \gamma]$.

As shown in FIG. 2, these views are carried by straight lines parallel to the first bisectrix and shifted by $\Delta\beta$ along the axis of the $\vec{\theta}$. Points may be plotted on these straight lines representing the coordinates in space $[\theta, \gamma]$ of the sampled values effectively acquired when reading the different views.

Thus, if we assume that the number of detectors is even, namely 2n, and that the straight line OF passes exactly between the two center detectors, $\gamma_n$ and $\gamma_{n+1}$, they appear offset by $|\Delta\gamma/2|$ on each side of axis $\vec{\gamma}$. The aim of the invention is to obtain, for each view, intermediate sampled values whose coordinates in space $[\theta, \gamma]$ are shown by stars * in FIG. 2. In other words, the aim of the invention is to obtain views comprising 4 n sampled values with an assembly of 2 n detectors only and thus to improve the definition of the reconstructed image.

Before defining the invention in a more general formulation, a particular solution will be completely described by fixing a priori a certain number of parameters and then it will be explained how some of them may be varied for defining a set of possible solutions.

According to one possibility of the invention, a permanent and predetermined angular shift is caused between the assembly of detectors 14 (i.e. the case 13) and the straight line OF. According to the example chosen, the angular shift between the straight line OF and the nearest detector is chosen equal to $-(\Delta\gamma/4)$. That means that the assembly of detectors is shifted in an anti clockwise direction, considering FIG. 1, so that the center of the input face of detector $\gamma$ n is shifted angularly by $-(\Delta\gamma/4)$ with respect to OF and so that the detector $\gamma$ n+1 is shifted by $3\Delta\gamma/4$ with respect to the same straight line.

FIG. 3 shows the configuration of the views in space $[\theta, \gamma]$ after this shift.

In the example described, two series $V_i$ and $W_i$ of views are taken and stored and the machine is adapted so that $\pi/\Delta\gamma=N$, N being a positive integer, $\Delta\beta=2\Delta\gamma$.

In the case where each series of views is spaced apart over a revolution of the source-detector assembly, then N also represents the number of views of the series. If we assume for example that N is even, under these conditions, the views $W_i$ of the second series are shifted by $+(\Delta\gamma/2)$ with respect to the views $V_i$ of the first series.

FIG. 4 shows the representation of the views $V_i$ and $W_i$ in space $[\theta, \gamma]$.

Namely the transformation: $T(\theta, \gamma)=(\theta-\pi, -\gamma)$.

It can be demonstrated that the function of absorption of a view is invariable by this transformation T. Now this transformation T may be broken down in space $[\theta, \gamma]$ into a translation $-\pi\vec{\theta}$ followed by a symmetry with respect to $\vec{\theta}$. This transformation is illustrated per se in FIG. 5. If said transformation is applied to the series of views $W_i$, it can be seen (FIG. 6) that the sampled values of the thus transformed views $W_i$ take on automatically the coordinates of the desired intermediate sampled values, in the series of views $V_i$. In other words, the application of this transformation to the sampled values of the views of the second series results in completing the views of the first series. Each completed view $V_i$ is therefore sampled twice as many times as the original view $V_i$.

A step may then be inferred therefrom for rearranging the data representing this transformation. In this arrangement, the views of the first series are completed by sampled values of the second series whose coordinates $(\theta', \gamma')$ in space $[\theta, \gamma]$ satisfy the relationship:

$$(\theta x, \gamma x)=(\theta'+(2k+1)\pi, -\gamma')$$

k being a relative integer, $(\theta x, \gamma x)$ being the coordinates in space $[\theta, \gamma]$ of the desired sampled values of the first series.

The expression $(2k+1)\pi$ translates the fact that the views $W_i$ of the second series actually acquired may be theoretically extended in space $[\theta, \gamma]$ from $-\infty$ to $+\infty$. Because of the periodicity of the views beyond a complete revolution, which may be represented thus: $W_i=W_j \rightleftarrows i=j$ modulo N.

In other words, even if the translation $\theta'+(2k+1)\pi$ does not designate a view $W_i$ which has been actually acquired, it is sufficient to search for $k$ so that $:\theta x=\theta'+(2k+1)\pi$ is verified with $\theta'$ designating a view of the second series $W_i$ which has been actually acquired.

Once the rearrangement of the data such as described above, has been carried out, it only remains to apply a reconstruction algorithm known per se, comprising a convolution and a back projection to the completed views of the first series for reconstructing an image with improved resolution. Referring again to FIG. 1, the essential parts of the computer associated with the detectors 14 has been described in the form of a functional block diagram. The sampled values read at the outputs of detectors 14 are transformed into digital informations through an analog-digital convertor 18 then processed in preprocessor 19 effecting the usual operations of calibration and logarithmic transformation. The informations thus transformed represent linear attenuation values and this digital informations are stored in memory M. This latter is divided into a memory A receiving in a first stage digital informations representative of the views $V_i$ of the first series and a memory B receiving digital informations representing the views $W_i$ of the second series. According to the foregoing this latter is in the form of a memory unit matrix comprising 2n columns (number of detectors by views) and N lines (number of views $W_i$) in the case where the acquisition of the second series of views $W_i$ takes place during a complete revolution and with $\Delta\beta_{wj}=2\pi/N$.

Furthermore, for reasons which will appear clearly further on, memory A is in the form of a storage unit matrix comprising 4 n columns and N lines (number of views $V_i$) since the example described also corresponds to an acquisition of the views $V_i$ over a complete revolution and with $\Delta\beta_{Vi}=2\pi N$.

Filling of memory A with the informations representative of views $V_i$ takes place on the basis of one storage unit out of two; these units are represented by hatching unit in FIG. 1. Memory A is associated with reading means 20 which organize the transfer of informations to a processor 21, known per se, and whose role is to apply the above mentioned reconstruction algorithm. However, reading of a line from memory A is only commanded when all the storage units of this line which have not been "filled" during the phase of storage of views $V_i$, have received digital informations read from memory B.

The algorithm which will now be described and which is derived from the relationship $(\theta x, \gamma x)=(\theta'+(2k+1)\pi, -\gamma')$ allows the transfer of informations to be organized from memory B to memory A for completing it. This relationship has been expressed up to now in space $[\theta, \gamma]$ for facilitating the demonstration, because the views $V_i$ of $W_i$ have there a particularly simple representation. However, the parameters taken into account for addressing the memories at the time of reading views $V_i$ and $W_i$ are in fact:

$\beta$: the angular position of the source-detectors assembly and, $\gamma$: representative of the detectors.

It can be shown that the simple relationship: $\theta=\beta+\gamma$ allows the relationship which precedes in space $[\beta, \gamma]$ to be transcribed in the following way:

$$((2k+1)+\beta_x+2\gamma_x, -\gamma_x)=(\beta', \gamma')$$

$(\beta_x)$ and $(\gamma_x)$ being coordinates in space $[\beta, \gamma]$ of the missing sampled values of views $V_i$ and $(\beta')$ and $(\gamma')$ being the coordinates of the sampled values of the views $W_i$. To simplify the algorithm it is assumed that N is even namely that $N=2K=2\pi/\Delta\beta$, with K being a positive integer, but it should be noted that an uneven N does not constitute a major obstacle to the definition of a similar algorithm whose use ends in the same result.

The problem boils down to a simple calculation of address for searching in memory B for the digital information representative of the desired sampled values and for recopying this information in memory A.

If we take the $i^{th}$ view of the series $V_i$, it is stored as a whole in the $i^{th}$ line of the memory matrix A but the sampled values to be completed have an address of the form:

$$A(i_A, j_A=2m-1) \text{ with } m\in[1,2n]$$

It is inferred from the preceding relationship that the number $i_B$ of the line of the memory matrix B where the sampled value to be transferred to the address A ($i_A$, $j_A$) is to be found, is $i_B=(K+m+i_A-n-1)$ modulo N with $i_B \epsilon [1,N]$.

In other words, if the expression $(K+m+i_A-n-1) \notin [1,N]$, N is subtracted or added as often as necessary for bringing said expression back into the interval [1,N].

Once the line $i_B$ has been determined, the number of the column $j_B$ for selecting the desired sampled value is $j_B=(2n+1-m)$ then it is sufficient to transfer the information contained at address B ($i_B$, $j_B$) for writing it into address A ($i_A$, $j_A$). The data transfer and address calculation operations may be controlled by a special processor or preferably by a subprogram of the computer. This processor or subprogram is shown symbolically in FIG. 1 by the functional block 22 interconnected between memories A and B. It also drives the reading means 20 (functional connection 23) controlling the transfer of informations from memory A to the reconstruction processor 21.

The invention has been described above by fixing certain parameters for the sake of simplicity. Other possible variants will now be considered.

Thus, we are in the case where $\Delta\beta=2\Delta\gamma$ with $\pi/\Delta\gamma=N$.

In this case, there are as many views in both series and, in any case, the views of the second series must be taken under these conditions. It may happen however that the number of views of the first series is greater than what is normally required for reconstituting an image. In this case, a first generalization of the invention will consist in taking and storing two series of views with a shift between views of $h\Delta\beta$ for the first series $V_i$ and $\Delta\beta$ for the second series $W_i$. In this case, it is apparent that only certain views of the two series will be shifted with respect to each other by $\Delta\gamma/2$ since views of the second series do not have "neighboring" views of the first series, because of the angular pitch difference. FIG. 7 illustrates this situation, in the case where h=2. It can be seen that $W_{2i+1}$ does not have a "neighboring" view of the first series shifted by $\Delta\gamma/2$. Furthermore, FIG. 7 shows that sampled values of the series $W_i$ are useless after the transformation T if h is different from 1. To optimize the arrangement, it is therefore possible to take and/or process only one sampled value out of h in each view of the series $W_i$. This compensates for the need of having to take views $W_i$ with an angular pitch $2\Delta\gamma$.

Another situation in which only certain views of the two series will be shifted by $\Delta\gamma/2$ is that of an "optimized" acquisition of the views of each series in less than a revolution per series. It is in fact known that the number of views required for reconstituting an image may be acquired in less than a revolution of the source-detectors assembly, namely a half revolution increased by the angular sector of the fan 11. Reconstruction algorithms exist which are adapted to this method of data acquisition. If the principle of the invention is applied to a tomodensitomer using such an algorithm the two series of views will only have one sector of rotation in common (the first series being for example taken alone from a first angular sector then views of the two series from a second common angular sector and the end of the second series being taken alone from a third angular sector) and of course, in such a case, the shift between views of $\Delta\gamma/2$ such as defined above is only meaningful for the second angular sector, so for a part of the views of the two series.

Moreover, other angular shift values (of the detectors with respect to the source on the one hand and between views of the two series on the other) are possible.

If we consider the assembly of detectors of FIG. 1, namely 2n detectors, the case has been analyzed in detail of a shift of the detectors such that $\gamma_n=-(\Delta\gamma/4)$ with N even and a shift of $+(\Delta\gamma/2)$ between views of the two series, which means that $W_i$ will be taken at $\beta=+(\Delta\gamma/2)$ if the view $V_i$ was taken at $\beta=0$, $\beta$ being oriented positively in the trigonometric sense. It can be demonstrated that the result would be the same if the shift between views was $-(3\Delta\gamma/2)$.

On the other hand, if N is uneven, the two possible values of the angular shift between the views are $3\Delta\gamma/2$ or $(\Delta\gamma/2)$.

Moreover, the angular shift between the detectors and source F may also be such that $\gamma_n=-(3\Delta\gamma/4)$, i.e. $\gamma_{n+1}=(\Delta\gamma/4)$.

Thus, if N is even, the angular shift between views may be $-(\Delta\gamma/2)$ or $+(3\Delta\gamma/2)$ and if N is uneven, the angular shift between views may be $+(\Delta\gamma/2)$ or $-(3\Delta\gamma/2)$.

Now, an angular shift of $-(3_2\Delta\gamma/2)$ with respect to a view of the first series is equivalent to a shift of $+(\Delta\gamma/2)$ with respect to the preceeding view of the same series and a shift of $+(3\Delta\gamma/2)$ is equivalent in the same way to a shift of $-(\Delta\gamma/2)$ with respect to the following view.

The generality of the solution may then be expressed in the following way:
the angular shift between the straight line OF and the detector the nearest thereto is adjusted to $\Delta\gamma/4$ in absolute value, i.e. $|\Delta\gamma/4|$
the relative angular shift between the views of the two series $V_i$ and $W_i$ is $\Delta\gamma/2$ in absolute value, i.e. $|\Delta\gamma/2|$.

On most tomodensitometers there exist means for the precise adjustment of the position of the detector assembly (that is to say the case 13) with respect to the source. In most case, this "vernier" is adjusted during the setting-up phase of the apparatus so as to cancel out as precisely as possible any shift between the detectors and the source, namely: $\gamma_n=-(\Delta\gamma/2)$ and $\gamma_{n+1}+(\Delta\gamma/2)$.

The same means may be used for causing the permanent shift of the detectors at $|\Delta\gamma/4|$.

In so far as the dynamic shift between the views of series $V_i$ and $W_i$ is concerned, different methods may be used. For example, the first series may be acquired during a first revolution and a second series during a second revolution of the source-detectors assembly.

A simple way of obtaining the desired shift between the first and second revolutions consists in using an incremental coder whose elementary counting step is $\Delta\gamma/2$ (or a submultiple of this value), that is to say that it supplies a usable pulse every $\Delta\gamma/2$. Two successive views of a series would thus be initiated every 4h pulses of the incremental coder for the series $V_i$ and every 4 pulses for the series $W_i$ and the dynamic shift at the end of a revolution would be achieved for example by "jumping" a pulse of the incremental coder before acquiring the first view of a second series. The logic processing means to be associated with the incremental coder for providing this dynamic shift function are of very great simplicity and their design is within the scope of a man skilled in the art. If the speed of the electronic circuits allows it (or possibly by adopting a lower speed of rotation of the source-detector assembly) it is also perefectly possible to proceed to an "interlaced" acquisition of the views of the two series. In the particular case described above, for example, the views could be acquired in the following way:

view $V_i$ would be acquired at $\beta = i\Delta\beta$
view $W_i$ would be acquired at $\beta = i\Delta\beta + (\Delta\gamma/2)$
view $V_{i+1}$ would be acquired at $\beta = (i+1)\Delta\beta$
view $W_{i+1}$ would be acquired at $\beta = (i+1)\Delta\beta + (\Delta\gamma/2)$ and so on.

Of course, in this latter case, the program of the computer would be modified for writing the data alternately into memories A and B.

The principle of the invention will now be generalized to a "continuous mode" tomodensitometer. This type of tomodensitometer is also known and is essentially distinguished from the pulsed mode tomodensitometer in that the fan-shaped beam is permanently generated and in that reading of the detectors for each taking of a "view" is provided by a progressive scanning of the array of detectors from one end to the other, for example from detector $\gamma_1$ to detector $\gamma_{2n}$.

Two additional parameters must therefore be taken into consideration:

the speed of rotation, v, of the source-detectors asembly;

the time interval $\tau$ separating the acquisition of the sample values corresponding to two adjacent detectors, considering a constant scanning speed.

FIG. 8 illustrates the way in which the representation of a view in sapce $[\theta,\gamma]$ changes if the parameters v and $\tau$ are taken into account. The view carried by the dash dot straight line corresponds to the pulse mode whereas the same view carried by the continuous straight line corresponds to the continuous mode.

The sampled values move parallel to the axis $\vec{\theta}$ since $\theta = \beta + \gamma$; $\beta$ varying during the acquisition. The two straight lines converge at $\gamma_1$ since scanning of the detectors begins by detector $\gamma_1$ and the next sampled value, $\gamma_2$, has moved to $\gamma_{2a}$ by a distance of $v.\tau$ in space $[\theta,\gamma]$, parallel to the axis of the $\vec{\theta}$. Let $\hat{a}$ be the angle between $\overrightarrow{\gamma_1\gamma_2}$ and $\overrightarrow{\gamma_1\gamma_{2a}}$. Since $\gamma_1$ and $\gamma_2$ are carried by a straight line parallel to the main bisectrix, the slope of the straight line $\overrightarrow{\gamma_1\gamma_{2a}}$ is:

$$\tan a = \frac{\Delta\gamma}{\Delta\gamma + v\cdot\tau} = \frac{1}{1 + \frac{v\cdot\tau}{\Delta\gamma}}$$

namely $a = \frac{v\cdot\tau}{\Delta\gamma}$ $$\tan a = \frac{1}{1+a}$$

The views are therefore carried by straight lines parallel to the straight line of equation $\theta = (1+a)\gamma$.

If we assume that $(1+a)\gamma = \gamma_3$, it can be seen that all the operations and transformations which have been described with reference to the pulsed mode in space $[\theta,\gamma]$ are kept in space $[\theta,\gamma_3]$ for the continuous mode. The pulsed mode may even be considered as a border line case of the continuous mode since a pulse emission from the source may be considered as causing "views" to be taken at zero speed ($v=0$, so $a=0$) and simultaneous reading of all the detectors corresponds to $\tau=0$, so $a=0$.

In the case of the continous mode, $\gamma_e$ (gamma eqivalent) therefore replaces $\gamma$ and $\Delta\gamma_e$ replaces $\Delta\gamma$ except in so far as the shift of the assembly of detectors is concerned with respect to the straight line OF, which remains $|\Delta\gamma/4|$.

Other scanning methods result in a variation of the coefficient $a$. For example, if progressive scanning is begun from the other end of the assembly of detectors all the foregoing is valid with $a = -(v\cdot\tau/\Delta\gamma)$.

What is claimed is:

1. A process for image reconstruction by tomodensitometry of the type including the steps of rotating a radiation source and detectors assembly in the plane of a cross-section the image of which is to be displayed, said radiation source emitting a beam of penetrating radiation in the form of a fan, and taking and storing a succession of image views for different angles of rotation of the source and detectors assembly with respect to a fixed reference axis, of said plane, the detectors of said assembly being arranged to converge towards a focal point of said radiation source and each view being sampled for angles $\gamma$ representative of the detectors and indexed from a straight line joining the center of rotation of said radiation source and detectors assembly to said focal point, the angular shift between two adjacent detectors being constant $\Delta\gamma$ and the angular shift between views being constant; with the angular shift between said straight line and the detector the nearest thereto adjusted to $\{\Delta\gamma/4|$ and the following conditions being provided: $\pi/\Delta\gamma e = N$, with N a positive integer, assuming $\gamma e = (1+a)\gamma$, where $a$ is a coefficient dependent on the speed of rotation of the source and detectors assembly and on the time for acquisition of a view, said process further comprising the steps of:

taking and storing two series of views (Vi, Wi) with an angular shift between views of $h\Delta\beta$ for the first series (Vi) and $\Delta\beta$ for the second series (Wi), at least some of the views of the two series being shifted with respect to each other by $|\Delta\gamma e/2|$ with $\Delta\beta = 2\Delta\gamma e$, h being a positive interger, completing the views of the first series by sampled values of the second series whose coordinates $(\theta',\gamma')$ located in the space $(\theta,\gamma e)$ with $\theta = \beta + \gamma e$, satisfy the relationship: $(\theta x, \gamma x (= (\theta' + (2k+1)\pi, -\gamma')$ with k a relative integer, $(\theta x, \gamma' x)$ being the coordinates in space $(\theta,\gamma e)$ of desired sampled values of the first series; and applying a reconstruction algorithm, comprising a convolution and back projection, to the completed views of the first series for reconstituting an image.

2. The process as claimed in claim 1, wherein the views $(V_i)$ of a series are taken and stored during a revolution of the source-detectors assembly and the views $(W_i)$ of the other series during the next revolution and a shift of $|\Delta\gamma e/2|$ is caused in the reading of the two series, between the two revolutions.

3. The process as claimed in claim 1, wherein the views $(V_i, W_i)$ of the two series are taken and stored alternately during the same revolution.

4. The process as claimed in claim 2 or 3, wherein, with h equal to 1, N views of the first series are completed by N views of the second series.

5. The process as claimed in claim 2 or 3, wherein, with h greater than 1, only one sampled value out of h is taken and/or processed in each views of the second series.

6. The process as claimed in claim 1 wherein $\gamma_e = \gamma$.

7. The process as claimed in claim 1 for continuous mode tomodensitometry, wherein $\alpha = |v.\tau/\Delta\gamma|$, v being the speed of rotation of the source-detector assembly and $\tau$ being the time interval separating the acquisition of the sampled values corresponding to two adjacent detectors.

8. A tomodensitometer of the type comprising a radiation source and detectors assembly mounted for rotation in the plane of a cross-section the image of which is to be formed, said radiation source being a source of penetrating radiation in the form of a fan, said detectors being arranged so as to converge towards the focal point of said source, said detectors being seen from said focal point at respective angles $\gamma$ indexed from a straight line joining said focal point to the center of rotation of the source and detectors assembly, two adjacent detectors being angularly shifted by $\Delta\gamma$, control means for determining a certain number of view taking angles $\beta$ of the source and detector assembly with respect to a reference axis system and for generating signals for controlling said taking of views,
  means for storing information representative of said sampled views for said angles $\beta$,
  computing means for applying a reconstruction algorithm, comprising a convolution and a back projection to a series of views, wherein:
  with the following condition satisfied: $\pi/\Delta\gamma_e = N$ with N a positive integer, assuming $\gamma_e = (1+\alpha)\gamma$, where $\alpha$ is a coefficient dependent on the speed of rotation of the source-detectors assembly and on the time for acquisition of a view,
  an angular shift between said straight line (OF) and the detector the nearest thereto is predetermined at $|\Delta\gamma/4|$
  said control means comprises means for taking and storing two series (Vi, Wi) of sampled views, said series being such that at least some adjacent views of different series are shifted therebetween by $|\Delta\gamma_e/2|$; the views of the first series being sifted angularly at the pitch of $h\Delta\beta$ and those of the second series being shifted angularly at the pitch of $\Delta\beta$, with $\Delta\beta = 2\Delta\gamma$ and h a positive integer, and
  rearrangement means for completing the views of the first series by sampled values taken from the second series whose coordinates $(\theta', \gamma')$ in the space $(\theta, \gamma_e)$ with $\theta = \beta + \gamma_e$ satisfy the relationship $(\theta x, \gamma x) = (\theta + (2k+1)\pi, -\gamma')$ with k a relative integer, $(\theta x, \gamma x)$ being the coordinates in the space $(\theta, \gamma)$ of desired sampled values of the first series.

9. The tomodensitometer as claimed in claim 8, wherein said control means comprise an incremental coder.

10. The tomodensitometer as claimed in claim 9, wherein the elementary counting pitch of said incremental coder is $\Delta\gamma_e/2$, or a submultiple of this value.

11. The tomodensitometer as claimed in one of claims 8 to 10, of the type with pulsed mode operation, wherein $\gamma_e = \gamma$.

12. The tomodensitometer as claimed in claim 8, wherein $\alpha = V\tau/\Delta\gamma$, v being the speed of rotation of the source-detector assembly and $\tau$ being the time interval separating the acquisition of the sampled values corresponding to two adjacent detectors.

* * * * *